June 17, 1930.  W. H. SMYTH  1,763,826
CUSHION TIRE TRACKLAYER TRACTOR
Filed Aug. 18, 1925   3 Sheets-Sheet 1
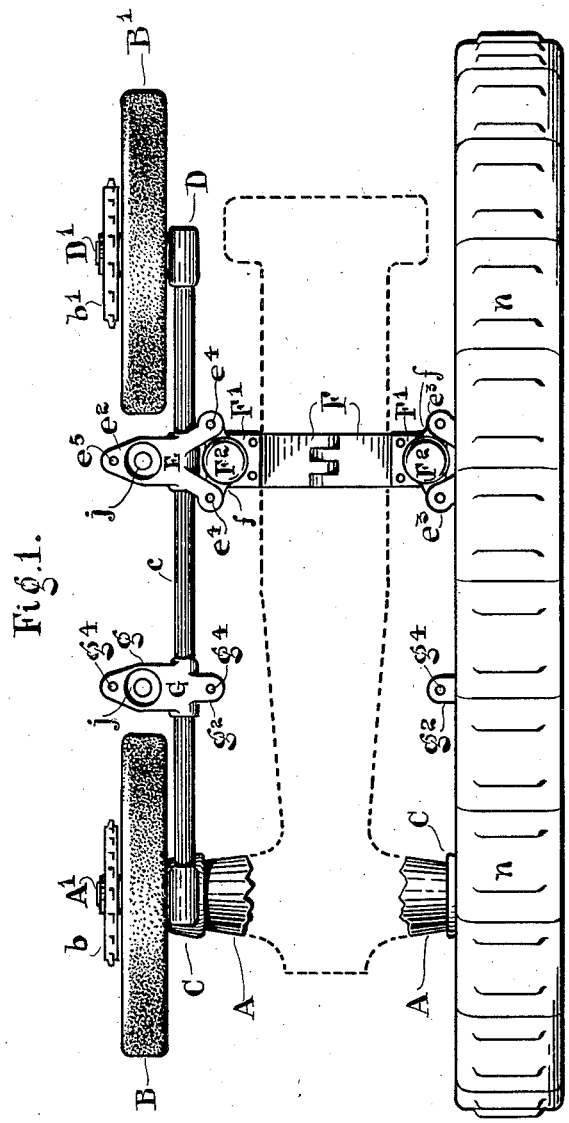
INVENTOR
William H. Smyth June 17, 1930. W. H. SMYTH 1,763,826
CUSHION TIRE TRACKLAYER TRACTOR
Filed Aug. 18, 1925 3 Sheets-Sheet 2
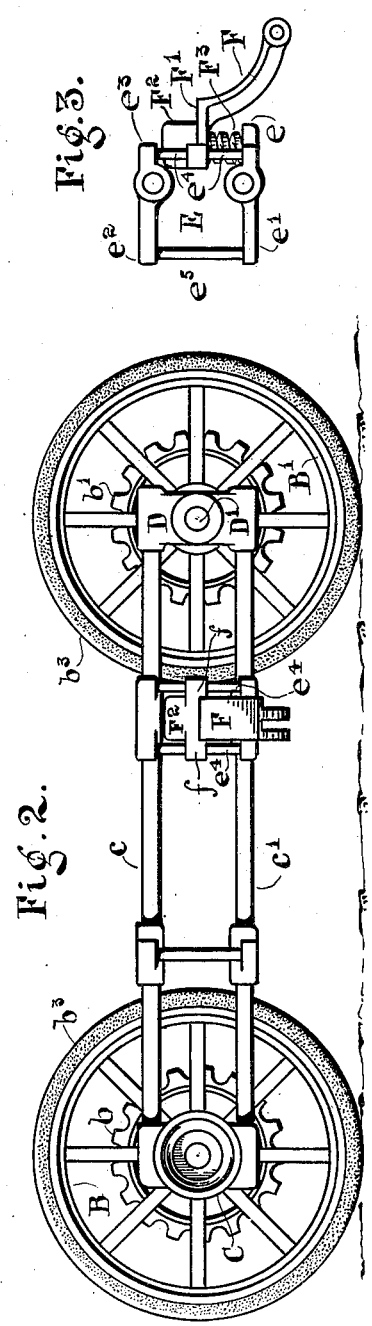
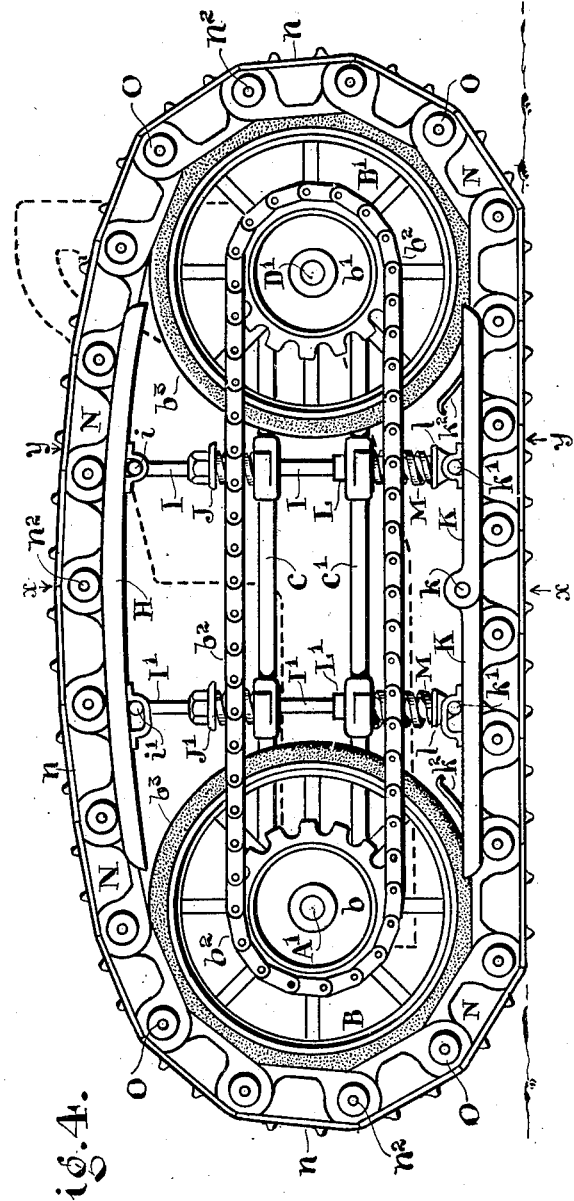
INVENTOR
William H Smyth

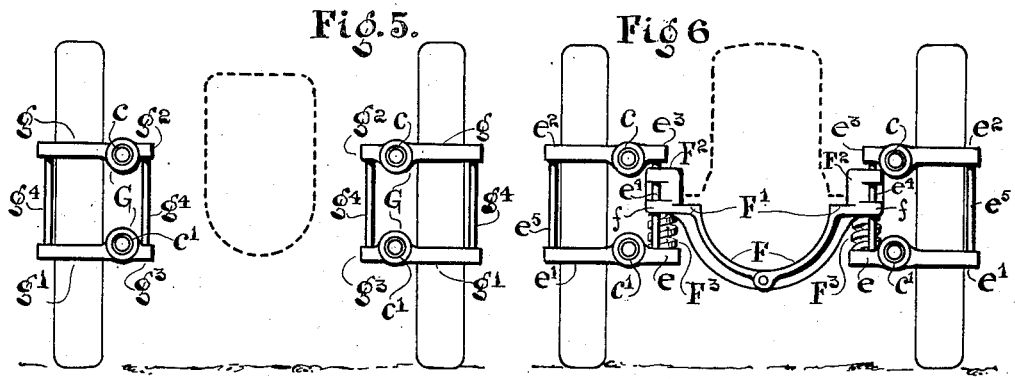
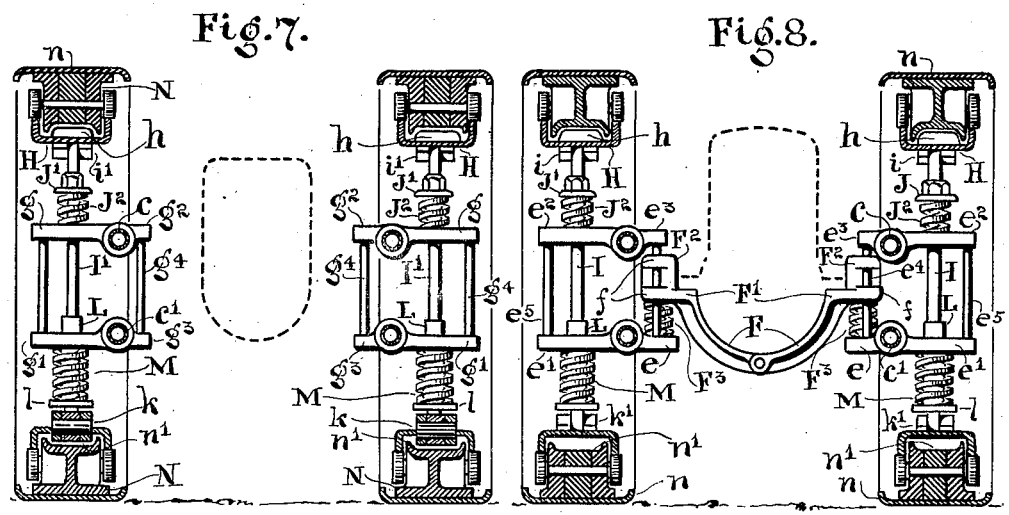
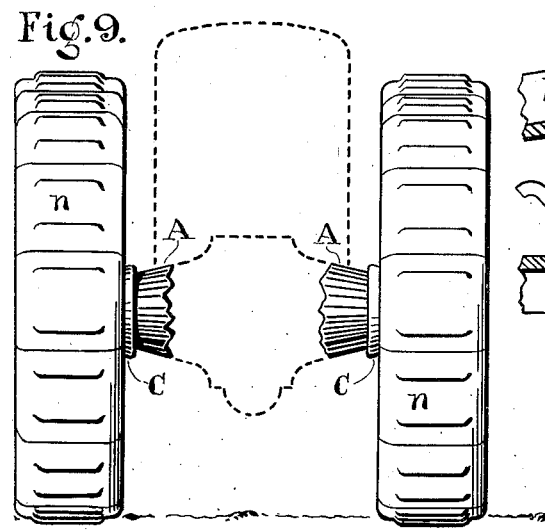
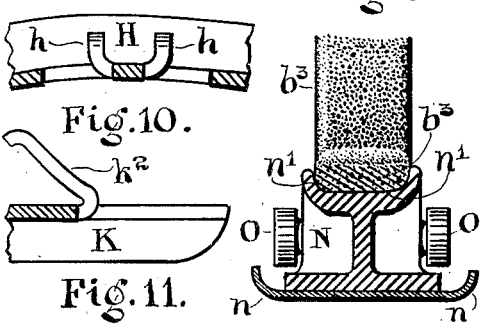

Patented June 17, 1930

1,763,826

UNITED STATES PATENT OFFICE

WILLIAM H. SMYTH, OF BERKELEY, CALIFORNIA

CUSHION-TIRE TRACK-LAYER TRACTOR

Application filed August 18, 1925. Serial No. 50,990.

My invention relates to motor and other vehicles. It has for its main object to combine in one vehicle the functional advantages of the tracklayer and the round-wheel types. A further object is to provide round-wheel-vehicle running-gear adapted to ordinary road service with tracklayer auxiliary appurtenances applicable to standard makes of tractors. And, incidental to these objects, to construct its working parts so simple in form as to be readily made from commercial stock materials and thus permit of its being built with the ordinary appliances of the village machine works or the farm repair shop.

A typical expression of my invention, which accomplishes these objects, is shown in the accompanying drawings wherein:

Fig. 1 is a plan view of the running gear with the endless track-rail in position on one side, and removed from the other;

Fig. 2 is a side elevation showing one side member of the running gear wheel-assembly;

Fig. 3 is an elevation detail view of the front end motor-support means, pertaining to one side wheel-assembly member;

Fig. 4 is a side elevation (in tracklayer tractor form), some minor parts omitted for clearness of illustration;

Fig. 5 is an end elevation of the rearward track-rail support brackets in position;

Fig. 6 is a similar view of the forward brackets;

Fig. 7 is a transverse section, on line $x$—$x$ of Fig. 4 with parts omitted for clearness of illustration;

Fig. 8 is a similar section on line $y$—$y$;

Fig. 9 is a rear elevation, with both track-rails in position;

Fig. 10 is a detail, in section, showing dirt removing scraper means of the track-rail support;

Fig. 11 is a detail, in section, of the ends of the track-chain ground-run control rail;

Fig. 12 is a detail, in section, showing the track-chain and support-wheel tire in operative relation.

As the track-rail assembly alone distinguishes the self-laying-track type from the 'round-wheeler' form of vehicle, and the power element being within the knowledge of mechanics skilled in this art; I will confine my description to those parts directly affected by my invention. And, as one of the main objects of the invention is to utilize the already provided motor means of tractors now on the market, I have in the drawings illustrated my invention in a form adapted to the 'Fordson' tractor as the one in general use on the farms and most likely to be called into requisition in the utilization of the invention hereinafter described. But as the device is of wider applicability and the particular motor means not essentially involved, I have shown it in dotted outline, as a more definite delineation and description would tend to obscure rather than to clarify the real subject matter.

With this understanding, and referring to the drawings, A represents a housing enclosing a power-shaft $A^1$, of a suitable motor. Hinged on the housing by loose sleeves C, C, there extends forwardly, on each side of the motor, a combined wheel-base and track-assembly frame. These side frames being substantially alike, I will confine my description mainly to one of them.

Upon the outer ends of the power-shaft $A^1$, are secured driving support-wheels, one of which is marked B, in Figs. 1 and 2. The assembly frame is herein shown as formed of an upper and a lower tubular member $c, c^1$, secured at the rearward end to sleeve C. On the forward end of the tubular frame is a front axle-block D, from which laterally projects an axle $D^1$, for the front support-wheel $B^1$. The support-wheels are preferably provided with cushion tires of rubber or other suitable material, as shown in Figs. 2, 4 and, on larger scale in detail Fig. 12. Concentric with the support-wheels may be secured thereto chain-wheels $b, b^1$, for power transmitting chains $b^2$, one of which is shown in position in Fig. 4.

Adjacent to the front support-wheel, on the tubular frame is a bracket E, to support the front end of the motor. The bracket E, is shown as consisting of an upper and a lower sleeve secured respectively upon the upper and lower tubular members of the frame. The lower sleeve is provided with an inwardly extending flange $e$, and an outwardly extending flange $e^1$, and the upper sleeve is provided with a corresponding outwardly extending flange $e^2$, and inwardly projecting lugs $e^3$, $e^3$, Figs. 6 and 8. Between the upper and lower extensions of the sleeves are vertical struts $e^4$, $e^4$, and $e^5$.

Connecting the brackets E, E, (to support the forward end of the motor), is a stirrup F, Figs. 6 and 8, formed of two connected members, one of which is shown in separate detail as Fig. 3. The stirrup is provided with a horizontal flange $F^1$, as an attachment means for the motor casing as indicated in the figures last referred to. It is also provided with lugs $f$, $f$, to slidably engage the struts $e^4$, $e^4$, as shown in Figs. 1, 2, 3, 6 and 8. The stirrup also has a spring-abutment pocket or inverted cup $F^2$. Between the abutment $F^2$, and the flange $e$, is a load-bearing spring $F^3$.

Adjacent to the wheel B, is another bracket G, Fig. 1, substantially similar to E, lacking only the latter's stirrup support provision. It is provided with an upper and lower outwardly extending flange $g$, and $g^1$, respectively. Also it is provided with lugs $g^2$, $g^3$, extending inwardly; and between the upper and lower flanges and lugs are struts $g^4$, $g^4$, shown best in Figs. 5 and 7.

Extending between the support-wheels B, $B^1$, is a channel-section track-rail support rail H, tangential to the upper peripheries of these wheels. It is positioned by and supported upon vertically moveable standards I and $I^1$. These standards are suitably hinged to the support rail H, respectively at $i$ and $i^1$, as shown in Fig. 4. The standard I, extends downwardly through the flanges $e^2$, and $e^1$, and in like manner the standard $I^1$, extends downwardly through the flanges of brackets G. The standards I and $I^1$, are provided with adjustable abutments J, and $J^1$, respectively, and between these abutments and the upper flanges of the brackets springs $J^2$, $J^2$, are provided seated in suitable abutments sockets $j$, $j$, Fig. 1.

A channel-section track-control rail K, extends between the lower peripheries of the support-wheels $B^1$, $B^1$; it is preferably in two sections hinged together about midway of the length as shown at $k$ Fig. 4. Concentric with the standards I, $I^1$, the control rail K, is provided with tubular standards L, L, extending upwardly through the flanges $e^1$, and $g^1$, telescoping on the standards I and $I^1$. The lower ends of the tubular standards are suitably hinged to the control rail K, as shown at $k^1$, $k^1$, Fig. 4. Each of the tubular standards L, L, adjacent to its hinge connection is provided with an abutment plate $l$, $l$, and between each such abutment and the lower side of flanges $e^1$, and $g^1$, is a spring M, M. The control rail, K, may extend longitudinally beyond the peripheries of the wheels B, $B^1$, and to permit of this extension, the horizontal web of the control rail K, is cut and bent inwardly and upwardly away from the wheel peripheries, as shown at $k^2$, $k^2$, of Fig. 4 and on larger scale in detail Fig. 11.

At any suitable point or at intervals along its length, the horizontal web of the guide rail H, is cut on three sides and bent upwardly, as shown in Figs. 7 and 8 at $h$, and on larger scale in detail Fig. 10.

The support-wheels B, $B^1$, together with the track support rail H, and track-control rail K, constitute a substantially continuous track-guideway, around which may be trained an endless track-rail N. This track is provided with tread-shoes $n$, adapted to ground traction and support functions, as shown in Fig. 1 and various other figures. Raised inwardly of the tread-shoes, preferably on a central web, is a transversely continuous trackway surface slightly wider than the tire width of support-wheels B, $B^1$, which travel thereon. This traction surface $n^1$, Figs. 7, 8 and 12, is shown concave in transverse section to form an endless shallow trough-way conforming to the transverse section of the effective peripheral bearing surface or ground contact of the rubber tire $b^3$, of the wheels B, $B^1$, as shown on enlarged scale detail in Fig. 12.

On the outer ends of the track-rail hinge-pins $n^2$, are anti-friction rollers O, positioned outwardly of the trackway surface $n^1$, and adapted to roll on the upturned side-flanges of the support-rail H, and likewise to roll on the downturned side-flanges of the control-rail K. The chain-support rail H, and the chain-control rail K, are slightly wider than the trackway $n^1$, and their side-flanges overlap the inturned edges of the track-rail. Thus the control-rail K, with its downturned flanges, overlaps and parallels the ground run of the track-rail on three sides, as shown in the various views, and provides a closely fitting dirt-excluding cover of this stretch of the track-rail.

The invention herein departs from accepted standard practice in tracklayer construction, by dispensing with sprocket-wheels in gear-and-rack driving engagement with the track-rail and substituting friction-drive of peripherally smooth untoothed wheels. Thus, in operation, frictional contact of the cushion-tired support-wheels B, $B^1$, with the trackway surface $n^1$, is relied upon to effect the tracklaying function and the progressive advance of the vehicle. The concave contour of the wheel-contact-surface transversely conforming to and closely fitting the peripheral sectional form of the support-wheel tires greatly enhances the frictional driving adhesion of the track-contact-surface and the tire-contact-surface of the coacting support-wheels. Simplicity of construction, minimizing of weight, shortening of over-all length and reduction in number of working parts and other desirable objects are thus attained together with elimination of wear inducing metal-to-metal contact in the drive elements which, under the conditions of ordinary service are subjected to the destructive abrasion of grit and dirt of ground materials as tracklayers are customarily constructed. By the construction herein disclosed all of the support-wheels are 'live'— i. e. driving—wheels; and, by the arrangement shown, the rail H, maintains an effective adjusted gripping tension on and driving contact of the track-rail N, with the cushion tires of the load-bearing drive wheels B, B¹.

The difficulty and destructive effect heretofore experienced, due to the accumulation of snow and ground materials in the tooth-pockets of the ordinary standard tracklayer gear (sprocket) -and-rack track-chain sprocket-wheel teeth, there are no tooth-pockets in which snow or dirt can accumulate and be destructively compacted. The control-rail K, in addition to resiliently controlling the flexure of the track-rail to conform to ground inequalities between the peripheries of the support-wheels through its coaction with the antifriction rollers O, serves also as an effective dirt-excluding cover for the ground-run of the track-rail. And, any dirt that may find its way into the longitudinal transversely curvilinear groove $n^1$, is removed by the cleaners $h$ and disposed of harmlessly.

To convert the device from a tracklayer into a round-wheel truck is a simple operation. The track-chain is uncoupled at one of its hinges, and its auxiliaries—the tensioning support-rail H, the control-rail K with their springs $J^2$, and M,—are lifted or dropped out of their guide brackets E and G. There being no rigid or mechanical attachment of these auxiliary parts their removal and the conversion of the tracklayer into a 'round-wheeler' is effected in a few minutes under service conditions without machine-shop facilities or special tools.

In view of these radical departures from present accepted practice and construction, I do not desire to be limited to the particular expressions of my invention used herein for illustrative purposes, nor to be limited in any other way than in accord with a liberal interpretation and the reasonable import of the claims which follow:

I claim—

1. A track-assembly for vehicles comprising an endless articulated track-rail with a support-wheel at each end bight in circumferential friction driven contact and a guide rail formed of hinged sections between the support-wheels adapted to control the flexure of the track-rail.

2. In a vehicle, a rearwardly pivoted two-point-supported wheel base side frame, track-rail guides flexibly hinged intermediate of their ends and standards slidably attached to the side frame adapted to position the guides.

3. A convertible tractor comprising a motor, a frame, support-wheels spaced apart thereon to form a two-point-support wheel-base on each side thereof, flexibly hinged track-rail guides adapted to control an endless track-rail trained around the support-wheels and track-rail standards slidably attached to the side frames to position the track-rail guides.

4. Running-gear for vehicles comprising two-point-support cushion-tire-wheel assemblies with an axle transversely thereof to constitute a four-point-support wheel-base, track-chains trained around the support-wheels in friction-driven circumferential contact and means adapted to control the flexure of each track-chain between support-wheel peripheries in its ground run.

5. Running-gear for vehicles comprising two-point-support cushion-tire-wheel assemblies with an axle transversely thereof to constitute a four-point-support wheel-base, track-chains trained around the support-wheels in friction-driven circumferential contact and spring-opposed means adapted to resiliently control the flexure of each track-chain between support-wheel peripheries in the ground run of the chain.

WILLIAM H. SMYTH.